(12) United States Patent
Boillot et al.

(10) Patent No.: US 6,430,472 B1
(45) Date of Patent: Aug. 6, 2002

(54) ROBOT FEATURE TRACKING DEVICES AND METHODS

(75) Inventors: Jean-Paul Boillot, Saint-Bruno; Denis Villemure, Longueuil, both of (CA)

(73) Assignee: Servo-Robot Inc., Quebec (CA)

( * ) Notice: Subject to any disclaimer, the term of this patent is extended or adjusted under 35 U.S.C. 154(b) by 0 days.

(21) Appl. No.: 09/466,927

(22) Filed: Dec. 20, 1999

(51) Int. Cl.[7] .............................................. G06F 19/00
(52) U.S. Cl. .................... 700/245; 700/95; 700/259; 700/262; 318/568.1; 318/568.2; 318/568.11; 318/568.12; 318/568.18; 318/577; 219/121.61; 219/121.62; 219/121.63; 219/121.64; 219/121.82; 219/121.83; 901/41; 901/42
(58) Field of Search ................................. 700/245, 259, 700/95, 114, 254, 262, 62; 318/568.2, 568.13, 568.15, 568.18, 568.16, 568.11, 568.1, 577; 701/23; 901/41, 42, 47, 9, 4; 414/5; 219/121.61, 121.84, 121.11, 121.31, 121.63, 121.64, 121.82, 121.83, 125.1

(56) References Cited

U.S. PATENT DOCUMENTS

| | | | |
|---|---|---|---|
| 4,833,381 A | * 5/1989 | Taft et al. ..................... 318/577 |
| 4,843,287 A | * 6/1989 | Taft ........................ 318/568.16 |
| 4,849,679 A | * 7/1989 | Taft et al. ..................... 318/577 |
| 4,952,772 A | 8/1990 | Zana ....................... 219/124.34 |
| 4,954,762 A | 9/1990 | Miyake et al. .......... 318/568.19 |
| 4,969,108 A | 11/1990 | Webb et al. ................. 700/259 |
| 5,006,999 A | 4/1991 | Kuno et al. .................. 700/253 |
| 5,014,183 A | 5/1991 | Carpenter et al. ............. 700/64 |
| 5,015,821 A | 5/1991 | Sartorio et al. .......... 219/124.34 |
| 5,066,847 A | 11/1991 | Kishi et al. ............. 219/124.34 |
| 5,380,978 A | * 1/1995 | Pryor ..................... 219/121.64 |
| 5,463,201 A | 10/1995 | Hendengren et al. .. 219/121.83 |
| 5,465,037 A | 11/1995 | Huissoon et al. ...... 318/568.11 |
| 5,520,062 A | * 5/1996 | Watanabe et al. ........... 73/866.5 |
| 5,582,750 A | 12/1996 | Hamura et al. ......... 219/124.34 |
| 5,624,588 A | 4/1997 | Terawaki et al. ....... 219/124.34 |
| 5,910,894 A | * 6/1999 | Pryor ..................... 219/121.64 |
| 6,011,240 A | * 1/2000 | Bishop et al. .......... 219/121.63 |
| 6,084,202 A | * 7/2000 | Okazaki et al. ........ 219/121.61 |
| 6,167,607 B1 | * 1/2001 | Pryor ...................... 29/407.04 |

OTHER PUBLICATIONS

Sicard et al., Joint Recognition and Tracking for Robotic, 1989, IEEE, pp. 7174–7728.*

Kusachi et al., Tracking a Feature Point in Profile Sata Using an Articulated Object Model and Tuning Parameters Using the Genetic Algorithm, 1999, IEEE, pp. 145–150.*

Man et al., Approaches to Low Level Image Processgin for VisionGuided Seam Tracking system, 1988, IEEE, pp. 601–603.*

* cited by examiner

Primary Examiner—William A. Cuchlinski, Jr.
Assistant Examiner—McDieunel Marc
(74) Attorney, Agent, or Firm—McDermott, Will & Emery

(57) ABSTRACT

Motorized slides are inserted between the end of a robot arm and a robot tool/sensor arrangement to provide additional positioning ability. A control unit of the slides cooperates with the control unit of the sensor to maintain the tool correctly positioned over a feature while the robot arm moves following a programmed path. The control unit of the sensor has look-ahead and additional buffers from which corrected information is determined to compensate for robot teaching inaccuracies, calibration and robot arm response errors. A sensor with two distinct probing zones is used to get information about the position of the tool tip and of the feature to assist in calibrating the sensor/tool relation.

20 Claims, 17 Drawing Sheets

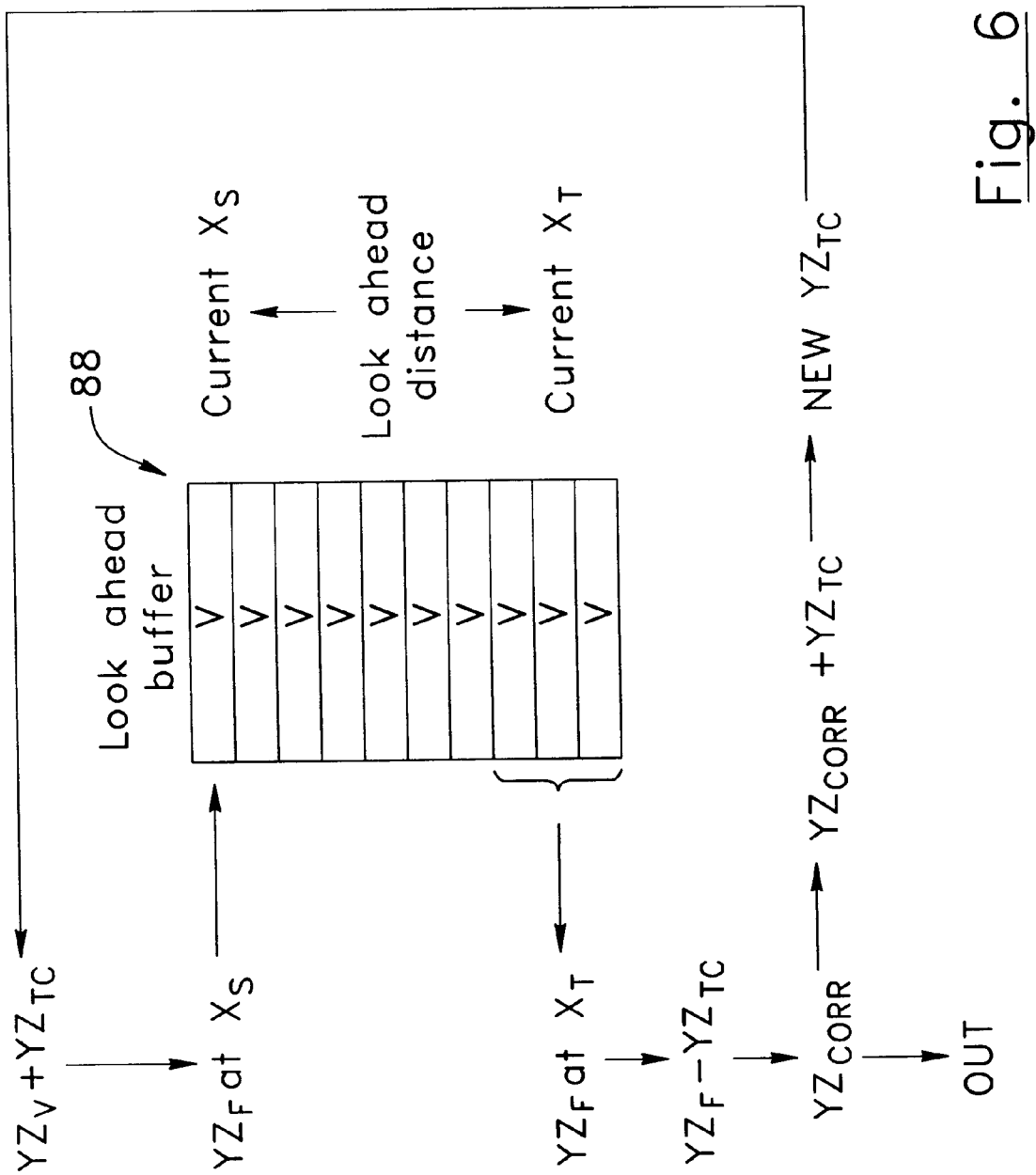

ROBOT FEATURE TRACKING DEVICES
AND METHODS

FIELD OF THE INVENTION

The present invention relates to robot feature tracking devices and methods, and more particularly to an assembly, a system and a method for providing additional positioning ability to a tool at an end of a robot arm, and improving the positioning accuracy of a robot tool over a feature to be processed. The invention applies for example to laser processing, such as laser welding, and to arc welding. It also applies to other types of processing that involve the guidance of a tool over a joint or feature to be processed.

BACKGROUND

It is well known that process robot tasks are often programmed using the method of play back of a taught path. If the work piece to be processed by the robot is not accurately positioned and oriented to correspond with this taught path, the robot will not position its tool accurately over the work piece and flaws will result.

The current solution to this problem is to install a sensor in front of the robot tool and to link this sensor with the robot through a special interface. In a welding operation, for example, the sensor measures the position and orientation of the joint, and communicates this information to the robot to correct its trajectory and tool orientation at the right time and place.

One problem is that many robots are not equipped with this type of interface. They cannot be linked with a sensor for joint or feature tracking.

Another problem is the calibration that is required in order to define the physical relation between the tool center point and the sensor. This relation must be well defined to allow the control unit of the sensor to accurately control the position and orientation of the tool while getting position information about the joint some distance in front of the tool. This calibration is usually performed by accurately positioning the tool center point over a reference object. If the operator does not accurately position the tool center point during this operation, the calibration will not be accurate. The robots usually have a very good positioning repeatability but poor absolute positioning accuracy. This means that the tool center point can be repeatedly sent back to the same position with a good accuracy, but the coordinates of this position in space will not be known accurately. The robot also makes an error when it informs the sensor about its current position during joint or feature tracking because of the response time of the robot arm and because of its mechanical elasticity. In the case of arc welding with a filler wire, the calibration problem is further complicated by the fact that the filler wire is not always straight when it gets out of the tool tip. It often gets out with a variable curve so that the tip of the wire does not correspond to the position of the tool center point. In the case of laser welding, the focal point of the laser beam moves relative to the theoretical position of the tool center point because of imperfections in the optical path.

U.S. Pat. No. 4,952,772 (Zana), U.S. Pat. No. 4,954,762 (Miyake et al.), U.S. Pat. No. 4,969,108 (Webb et al.), U.S. Pat. No. 5,006,999 (Kuno et al.), U.S. Pat. No. 5,014,183 (Carpenter et al.), U.S. Pat. No. 5,015,821 (Sartorio et al.), U.S. Pat. No. 5,066,847 (Kishi et al.), U.S. Pat. No. 5,463,201 (Hedengren et al.), U.S. Pat. No. 5,465,037 (Huissoon et al.), U.S. Pat. No. 5,582,750 (Hamura et al.) and U.S. Pat. No. 5,624,588 (Terawaki et al.) provide examples of welding control systems and methods of the prior art, some of which including error correction algorithms. Yet, none of them provides easy robot path correction for joint and feature tracking by an industrial process robot, which would be applied even at very high speed and without directly intruding into the robot control itself. Likewise, none of them satisfactorily solves the problem of accurate computing of the sensor to robot tool center point geometric relation, in static and dynamic operating modes, which is so critical to high speed joint tracking due to the use of the delayed shift method usually applied when a laser vision system is used in front of the robot tool.

SUMMARY

An object of the invention is to provide easy robot path correction for joint and feature tracking by an industrial process robot, which can be applied even at very high speed and without directly intruding into the robot control itself.

Another object of the invention is to provide additional positioning ability to a tool at an end of a robot arm.

A subsidiary object of the invention is to allow a robot to perform joint and feature tracking even if the robot is not equipped with the proper interface.

Another object of the invention is to provide a solution to the problem of accurate computing of the sensor to robot tool center point geometric relation, in static and dynamic operating modes, which is so critical to high speed joint tracking due to the use of the delayed shift method usually applied when a laser vision system is used in front of the robot tool.

According to the present invention, there is provided a motorized slide assembly for providing additional positioning ability to a tool at an end of a robot arm. The assembly comprises a slide arrangement having a base and a sliding element movable along a predetermined course relative to the base. A motor is mounted onto the slide arrangement. A drive device is connected to the motor for moving the sliding element along the course upon operation of the motor. Fasteners are provided for fastening the base of the slide arrangement to the end of the robot arm, and for fastening the tool onto the sliding element.

According to the present invention, there is also provided a motorized slide system for providing additional positioning ability to a tool at an end of a robot arm. The system comprises a motorized slide assembly including a slide arrangement having a base and at least one sliding element movable along a predetermined course relative to the base. A motor is mounted onto the slide arrangement. A drive device is connected to the motor for moving the sliding element along the course upon operation of the motor. Fasteners are provided for fastening the base of the slide arrangement to the end of the robot arm and for fastening the tool onto the sliding element. An encoder is operatively coupled to the motor to provide motor positional information. A control unit is provided for the motorized slide assembly. The control unit includes a communication interface for receiving sensor related data, a I/O interface for receiving and transmitting synchronization signals, a CPU for controlling positions of the sliding element, a memory, a servo-amplifier circuit for powering the motor, a slides control for controlling the servo-amplifier circuit in response to the CPU and the motor positional information provided by the encoder, and a bus circuit interconnecting the communication interface, the I/O interface, the CPU, the memory and the slides control together.

According to the present invention, there is provided a compensation method for compensating errors made by a control unit of a robot sensor when evaluating a relation between a position of a robot guided tool behind the sensor and a position of a feature to be followed by the guided tool. The method comprises the steps of recording position data generated by the sensor during a dry pass of the guided tool over the feature, the position data representing consecutive positions of the feature detected by the sensor, and subtracting the recorded position data from joint position errors computed by the control unit during a feature tracking operation where the guided tool is operated to process the feature.

According to the present invention, there is provided a control unit for a robot sensor tracking a feature to be processed with a robot tool positioned behind the robot sensor. The control unit comprises a sensor interface having a sensor control output and a video input. A memory is connected to the sensor interface. A CPU is connected to the sensor interface and the memory. A communication interface is connected to the CPU, the memory and the sensor interface, and has a communication port. The memory includes a look-ahead buffer that stores a number of successive feature position data computed by the CPU from signals received at the video input, as a function of tracked successive positions reached by the robot sensor during displacement over the feature. An additional buffer is connected to the look-ahead buffer, and stores a number of the successive feature position data as a function of tracked successive positions reached by the robot tool. The CPU has an operating mode causing a computation of a corrected position value required to maintain the robot tool correctly positioned over the feature by subtracting a current position of the robot tool and one of the position data stored in the additional buffer related to the current position of the robot tool from one of the position data stored in the look-ahead buffer related to the current position of the robot tool, and a transmission of the corrected position value through the communication port of the communication interface.

According to the present invention, there is also provided a robot sensor assembly for simultaneously detecting a position of a feature at a given look-ahead distance in front of a tool and a position of a tip of the tool. The robot sensor assembly comprises a sensor body, a bracket for side attachment of the sensor body to the tool, a first probe device attached to the sensor body and directed toward the feature in front of the tool, for providing surface range data along the feature whereby the position of the feature at the look-ahead distance in front of the tool is determinable, and a second probe device attached to the sensor body and directed toward a target region including the tip of the tool and the feature under the tip of the tool, for providing an image of the target region whereby the position of the tip of the tool is determinable.

According to the present invention, there is also provided a sensor control unit for a robot sensor assembly as hereinabove described. The sensor control unit comprises a range processing circuit having an input for receiving a video signal produced by the robot sensor, and an output for producing surface range data extracted from the video signal. A frame grabber has an input for receiving the video signal produced by the robot sensor, and an output for providing image frames stored in the frame grabber. A main CPU has an input connected to the output of the range processing circuit, and a communication port. A secondary CPU has an input connected to the output of the frame grabber, and a communication port. A communication link interconnects the communication ports of the main and the secondary CPUs. A communication interface is connected to the communication link. The secondary CPU has an operating mode causing a processing of the image frames stored in the frame grabber, a determination of the position of the tip of the tool from the image frames, and a transmission of the position of the tip of the tool to the main CPU via the communication link. The main CPU has a sensor-tool calibration mode causing a storage of the position of the tip of the tool received from the secondary CPU as calibration data, and a subsequent processing mode causing a comparison of the position of the tip of the tool received from the secondary CPU with a corresponding position in the calibration data, a computation of tool positioning correction values, and a transmission of the correction values through the communication interface.

To sum up, the addition of motorized slides at the end of a robot arm and the installation of the tool and the sensor on the motorized slides allow for joint and feature tracking to be performed even if the robot is not equipped with the proper interface, and thereby provide additional positioning ability to the tool at the end of the robot arm as the orientation of the slides can be set as needed and desired.

In one preferred embodiment of the invention, motorized slides are added at the end of a robot arm in order to enable real-time seam tracking while the control unit of the robot is not necessarily equipped with a sensor interface. A tool and a sensor are installed on the motorized slides so that a control unit, provided with a vision system to process the data from the sensor and a slides driver to control the position of each slide, maintains the tool correctly positioned over a joint or feature of an object by moving the motorized slides according to the position information computed by the vision system, while the robot arm moves along the joint or feature by following a programmed path.

The compensation method compensates for robot teaching inaccuracies, for calibration errors in the robot arm and for errors caused by the response time of the robot arm.

In another preferred embodiment of the invention, the compensation method, based on data recorded while the robot follows a programmed path, is used to modify the position correction information computed by the control unit of the sensor. This method compensates for errors made by the control unit of the sensor when it evaluates the relation between the position of the tool and the position of the joint or feature to be tracked, these errors being caused by incorrect programming of the robot path or by inaccuracies in the robot.

Accuracy can be improved also with the use of a sensor that gets information from the joint or feature in front of the tool and from the real position of the tip of the tool.

In another preferred embodiment of the present invention, a sensor with two distinct vision zones is used to get information about the position of the tip of the tool, as well as the position of the joint or feature some look-ahead distance in front of the tool, in order to help in calibrating the sensor/tool relation.

BRIEF DESCRIPTION OF THE DRAWINGS

A detailed description of preferred embodiments will be given herein below with reference to the following drawings, in which like numbers refer to like elements:

FIG. 6 is a schematic diagram representing a processing made by a CUS for the trajectory control of a tool, including a look-ahead buffer.

DETAILED DESCRIPTION OF THE PREFERRED EMBODIMENTS

Figure 1:
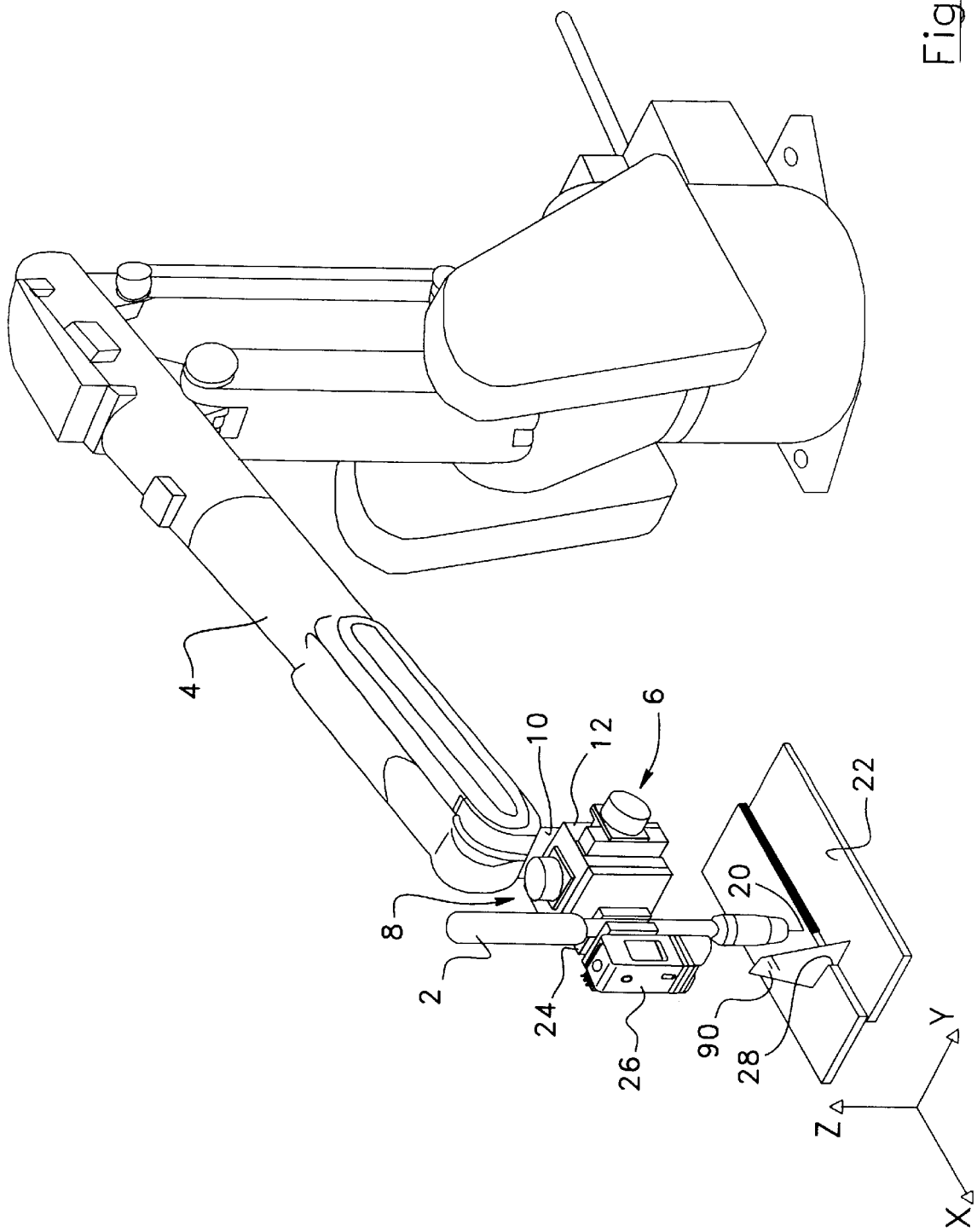
FIG. 1 is a perspective view of a motorized slide assembly according to the present invention, installed at an end of a robot arm.
Figure 2:
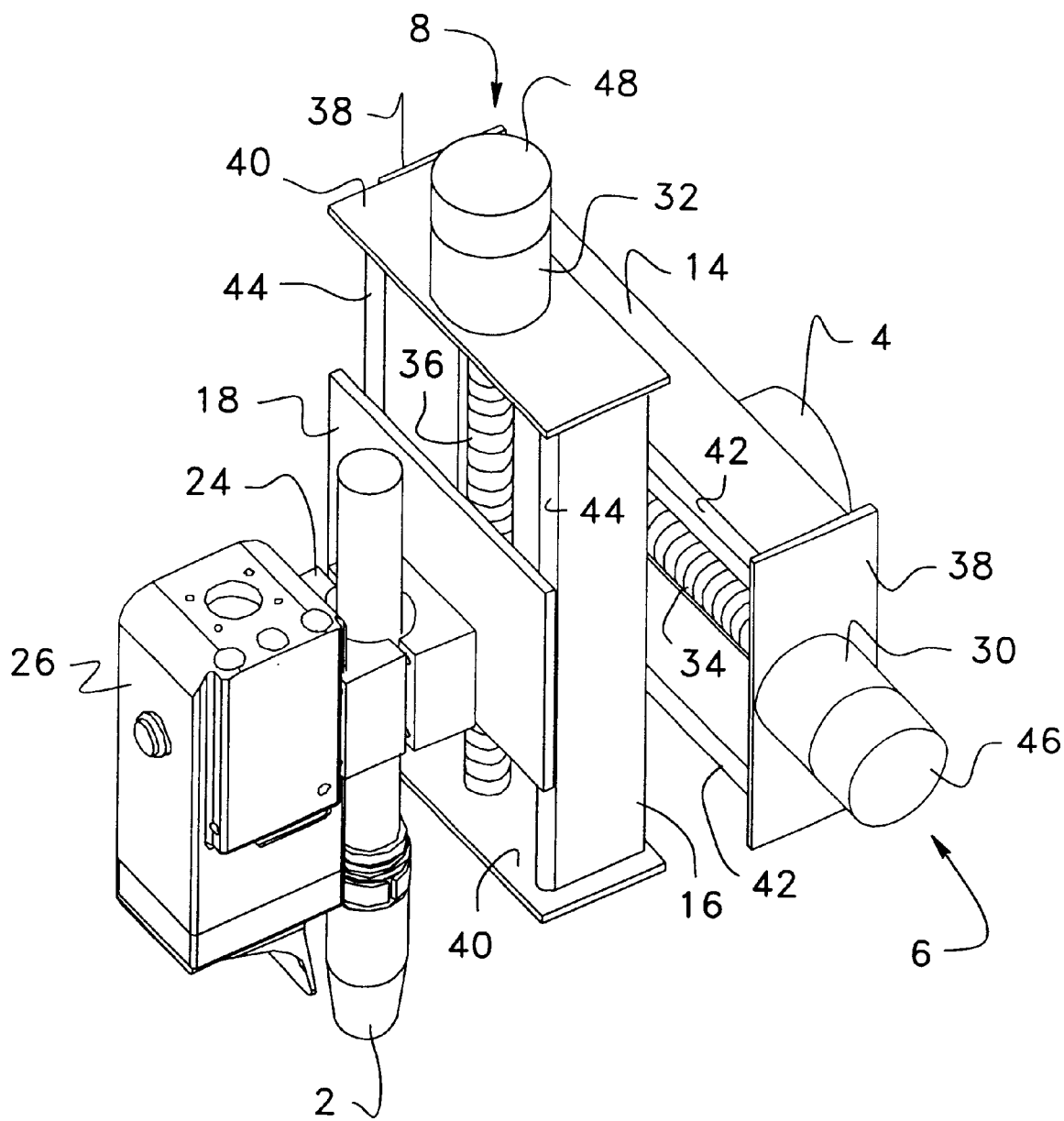
FIG. 2 is an enlarged view of the motorized slide assembly shown in FIG. 1, with a tool and a sensor.

Referring to FIGS. 1 and 2, there is shown a motorized slide assembly for providing additional positioning ability to a tool 2 at an end of a robot arm 4, according to the invention.

In the illustrated embodiment, the slide assembly combines two motorized slide arrangements 6, 8 assembled in a block 12. Each slide assembly 6, 8 has a base 14, 16 and a sliding element 16, 18 (the sliding element 16 of the slide assembly 6 being provided by the back of the base 16) movable along a predetermined course relative to the base 14, 16. The assembly is installed at the wrist of the robot arm 4. For this purpose, any kind of suitable fastener and fastening arrangement can be used, like a mounting bracket 10 which fastens the base 14 of the slide arrangement 6 to the end of the robot arm 4 as best shown in FIG. 2. The base 14 provides a mounting surface adapted to receive the end of the robot arm 4.

The processing tool 2 is mounted on the motorized slide assembly, with the tool center point 20 being preferably as close as possible to the position where it used to be without the motorized slide assembly, so that the robot can be programmed to weld a piece 22 as usual. For this purpose, any suitable fastener and fastening arrangement can be used, like a clamp 24 projecting from the sliding element 18 opposite the base 16 thereof.

A sensor 26 can be affixed to the tool 2 or the motorized slide assembly to detect the joint feature 28 to be tracked in front of the tool 2 as best shown in FIG. 1. For this purpose, the clamp 24 has preferably a mounting surface opposite the sliding element 18, adapted to receive the sensor 26.

Only one motorized slide arrangement 6 or 8 can be installed if the trajectory corrections must be made in only one direction, for example laterally or vertically, perpendicularly to the programmed trajectory. A second motorized slide arrangement 6, 8 can be added perpendicularly on the first one if the trajectory corrections must be applied both laterally and vertically. If necessary, other motorized slide arrangements including linear and rotational slide arrangements can be used to support more degrees of freedom for the movement of the tool 2.

Referring in particular to FIG. 2, the sliding element 18 of the slide arrangement 8 is in the form of a plate and the base 16 has spaced apart, opposite lateral surfaces 44 slideably receiving the plate. In the case of the slide assembly 6, the equivalent of the plate is provided simply by the back of the base 16 of the slide arrangement 8. Each base 14, 16 may take the form of an elongated frame having spaced apart, opposite end faces 38, 40, extending between the lateral surfaces 42, 44.

Each slide arrangement 6, 8 has a motor 30, 32 mounted onto the slide arrangement 6, 8 and preferably one of the end faces 42, 44. A worm screw 34, 36 extends between the end faces 42, 44 and is coupled to the motor 30, 32. A toothed member (hidden by the base 16 and the sliding element 18) projects from the plate 18 or the back of the base 16 and is meshed with the worm screw 34, 36. The worm screw 34, 36 and the toothed member form a drive mechanism for moving the sliding element 16, 18 along the corresponding course upon operation of the motor 30, 32. Any other suitable drive configurations can be used. The toothed member can be made for example by a nut screwed about the worm screw 34, 36, which has the advantage of holding the sliding element 16, 18 against the base 14, 16 without requiring additional guiding members.

The motors 30, 32 are preferably provided with encoders 46, 48 for control of the motors' positions.

Figure 3:
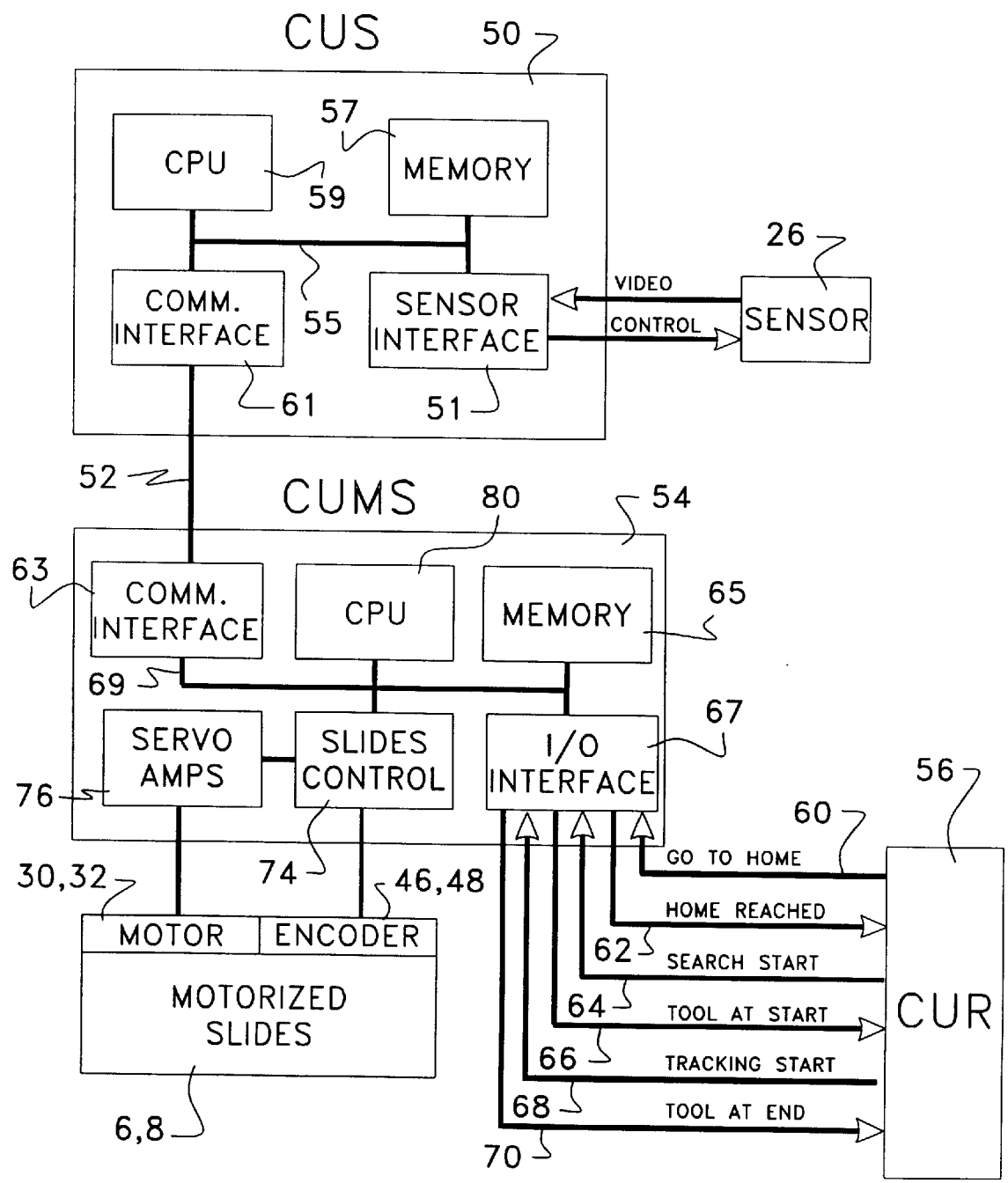
FIG. 3 is a schematic block diagram representing control units for the sensor, the motorized slides, and the robot, according to the invention.

Referring to FIGS. 1 and 3, in use, the robot can be first programmed off-line or by a "teach and play back" method as usual. During this robot teaching phase, the motorized slides 6, 8 are maintained in their central reference position, in order to provide the maximum trajectory correction range on either side of the programmed trajectory. The relation in the 3D space between the tool center point 20 and a given reference position in the sensing range of the sensor 26 must also be determined. This relation is used to calibrate the position of the tool center point 20 in the coordinate system of the field of view of the sensor 26. This calibration data is programmed in the control unit 50 of the sensor (CUS). This allows the control unit 50 of the sensor (CUS) to calculate the position of the tool center point 20 relative to the position of the joint 28, knowing the position of the joint 28 in the sensing range of the sensor 26.

Figure 4:
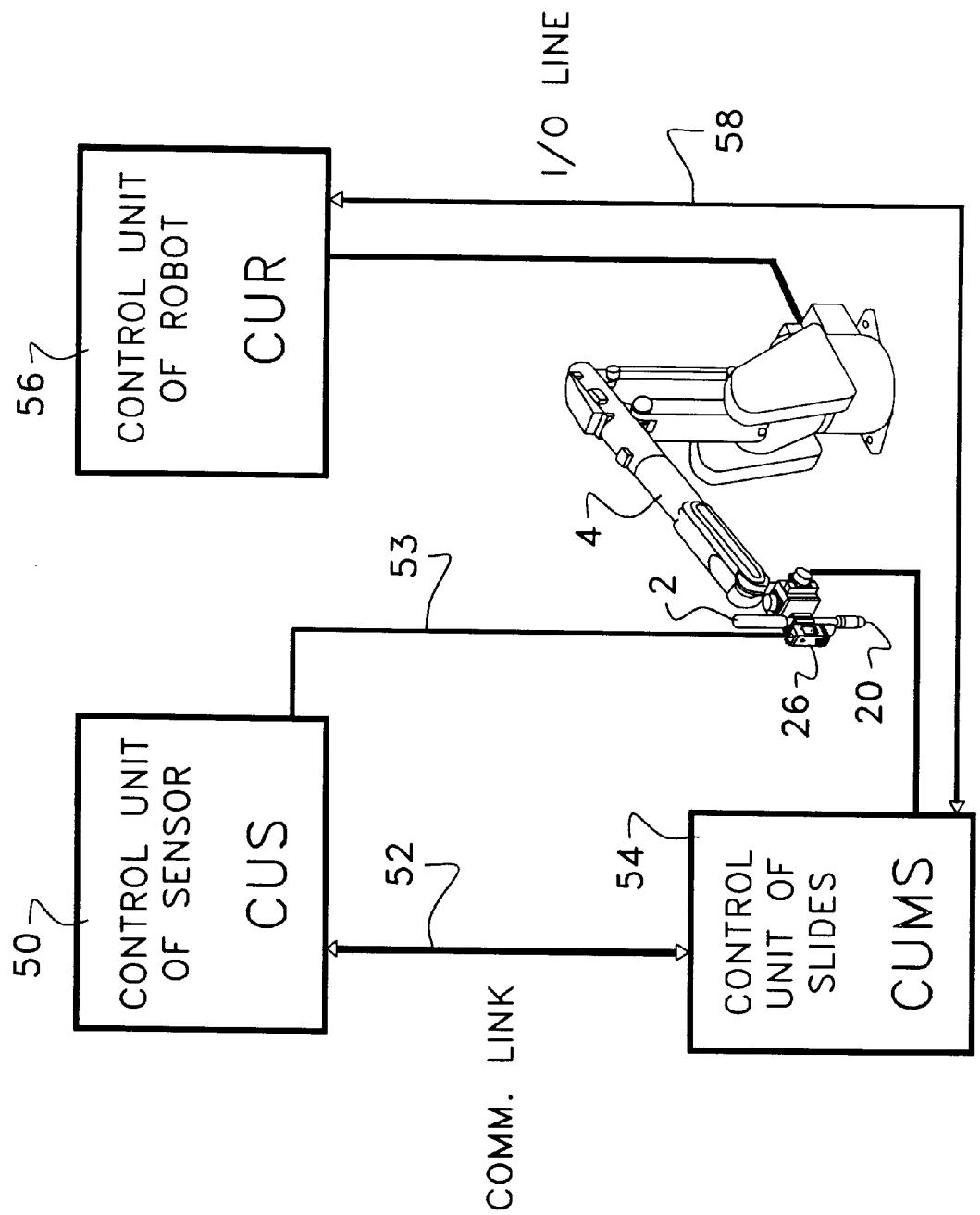
FIG. 4 is a schematic diagram representing a control system for the motorized slide assembly according to the invention, and the I/O interface with the control unit of the robot.

Referring to FIGS. 3 and 4, the CUS 50 is interfaced through a communication link 52 with the control unit 54 that drives the motorized slides 6, 8 (CUMS). The CUMS 54 is interfaced with the control unit 56 of the robot (CUR) through a I/O line 58 for synchronization. The I/O signals can be sent through electrical wires 60, 62, 64, 66, 68, 70 and can consist of voltage variations, a high voltage representing the activated state and a low voltage representing the deactivated state. The six signals required for the synchronization between the CUMS 54 and the CUR 56 are illustrated in FIG. 3. This synchronization can also be accomplished by sending messages through a communication device, such as a serial communication link or a parallel bus. The CUS 50 has a sensor communication interface 51 for communicating with the sensor 26 through a communication link 53 over which control and video signals are transmitted. A bus 55 interconnects the sensor interface 51 with a memory 57, a CPU 59 and a communication interface 61 forming a processing circuitry of the CUS 50. The CUMS has a communication interface 63 for receiving sensor related data from the CUS 50 through the communication link 52.

Figure 5A:
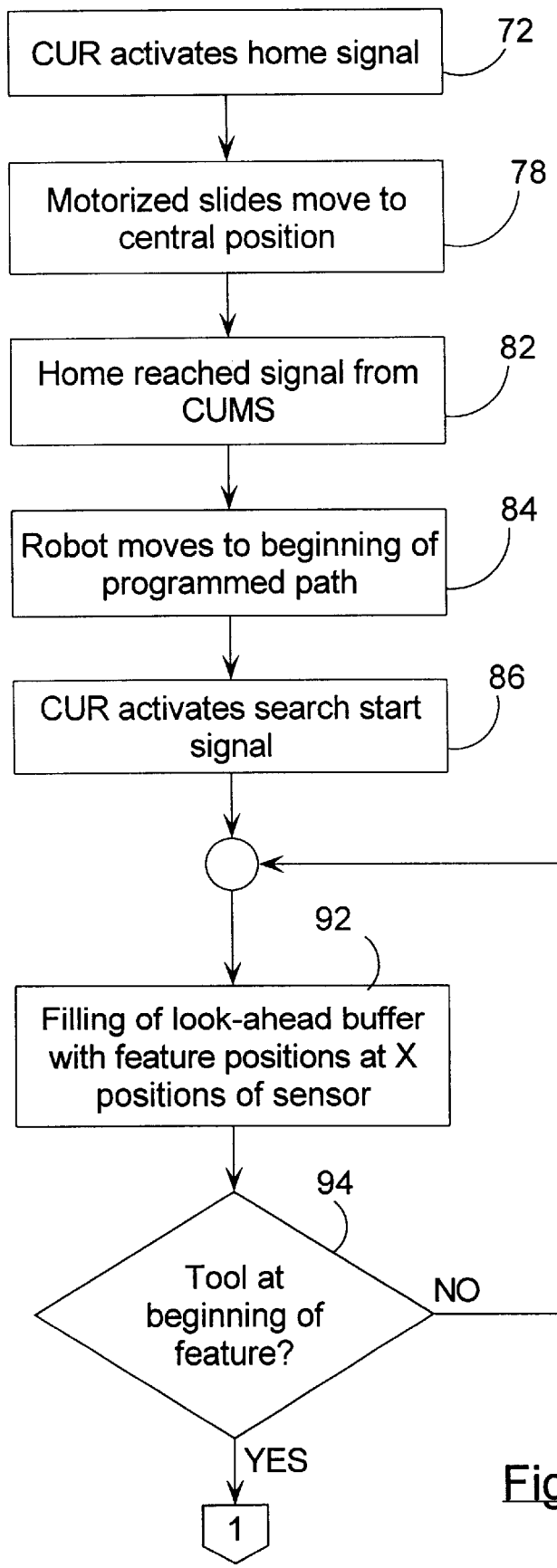
FIGS. 5A, 5B and 5C are complementary flow charts representing the method for the feature tracking with a motorized slides assembly according to the invention.
Figure 5B:
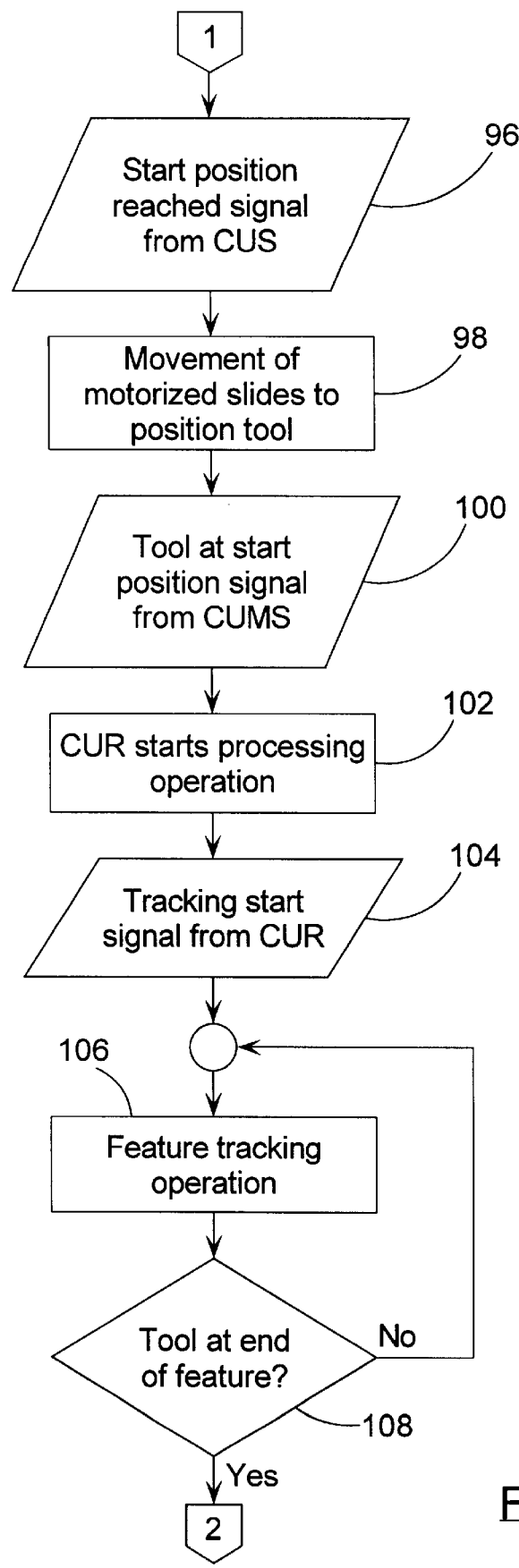
Figure 5C:
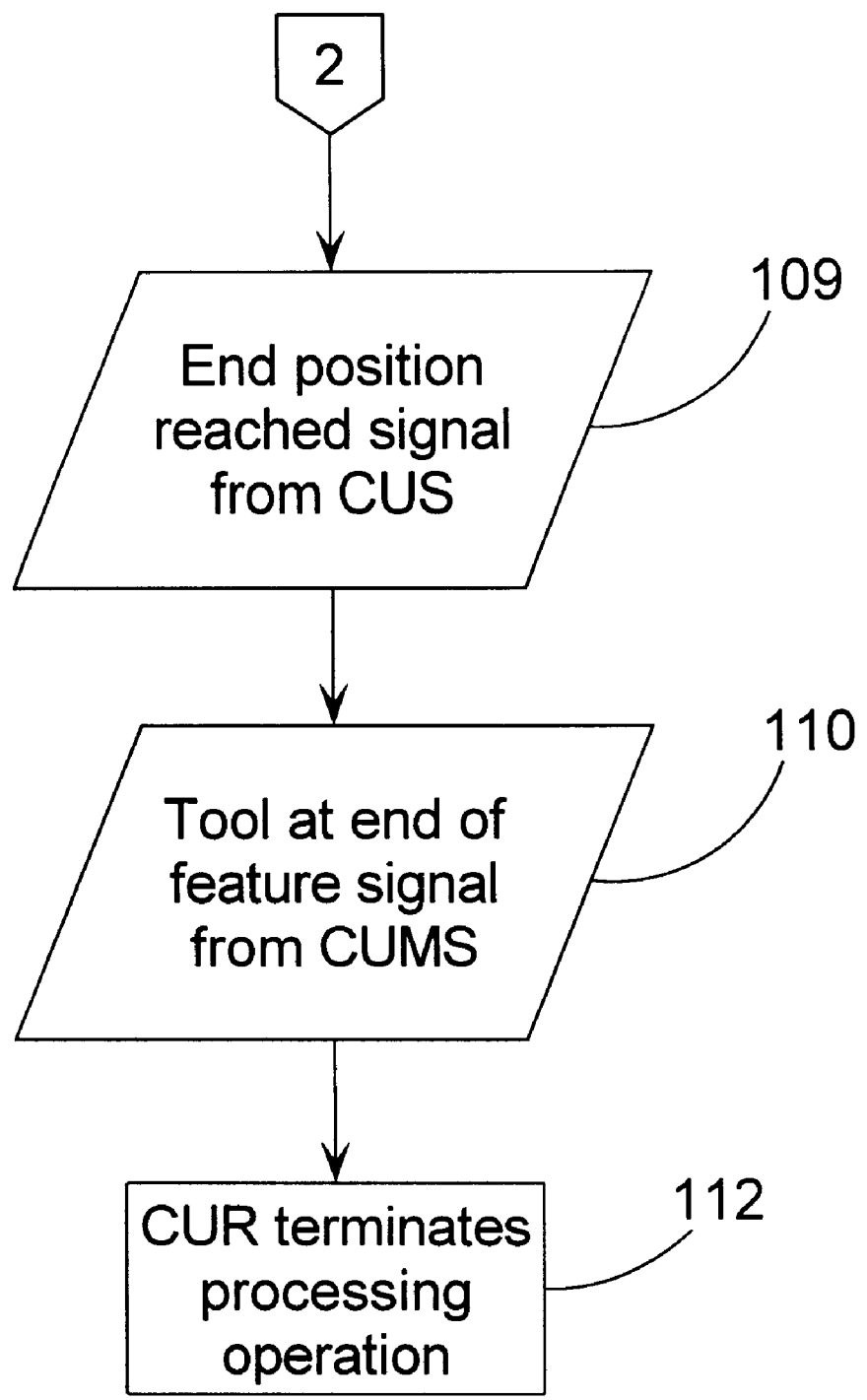

Referring to FIGS. 5A–5C, there is shown a flowchart illustrating the steps that can be carried out by the system for feature tracking with motorized slides installed on a robot, according to the invention. As depicted by block 72, the CUR 56 activates a home signal to inform the CUMS 54, through the I/O link 58, that it is time to bring the motorized slides to their central position, operation which is depicted by block 78.

Referring to FIG. 3, the CUMS 54 is interfaced with the motorized slides 6, 8 through a slides controller 74 and servo amplifiers 76. The motors 30, 32 of the slide arrangements 6, 8 are powered by the servo amplifiers 76 and the slides controller 74 senses their position through the position encoders 46, 48 that are coupled to the motors 30, 32. By sending the successive positions to be reached to the slides controller 74, the CPU 80 of the CUMS 54 controls the position of the motorized slides 6, 8. A memory 65, an I/O interface 67 and an interconnecting bus 69 complete the processing circuit of the CUMS 54.

Referring to FIG. 5A, once the central or home position of the motorized slides is reached, the CUMS 54 activates a signal to inform the CUR 56, through the I/O link 58, that the home position of the motorized axes is reached and that the process can start, as depicted by block 82.

Once the home position is reached, the tool 2 is brought to the beginning of the path, where the sensor 26 will start looking for the joint or feature 28 to be tracked, as depicted by block 84. The CUMS 54 waits for a search start signal from the CUR 56. When this signal comes as depicted by block 86, the tool 2 starts moving forward along the programmed path and the CUS 50 starts looking for the feature 28.

Referring to FIG. 6, there is shown computations related to the trajectory control and a look-ahead buffer 88 implemented in the CUS 50. Once the CUS 50 has found the $YZ_v$ coordinate of the feature 28 (in the reference system of the tool 2) at the current $X_s$ sensing position along the feature 28, it adds this coordinate $YZ_v$ to the current $YZ_{TC}$ coordinate of the tool to get the $YZ_F$ coordinate of the feature 28. The CUS 50 stores this $YZ_F$ value in the look-ahead buffer 88, associated with the current $X_s$ position of the sensor 26. Since the motorized slides 6, 8 are still at their home position, the $YZ_{TC}$ coordinate is considered to be (0,0) at this moment. The look-ahead buffer 88 is a circular buffer that contains the data sampled along the feature 28 between the observation zone 90 of the sensor 26 and the position of the tool center point 20 as shown in FIG. 1. The CUS 50 carries on this process until the tool 2 reaches the X position where the feature 28 was first found, as depicted by blocks 92, 94 in FIG. 5A.

When the tool 2 reaches the X position where the feature 28 was first found, the CUS 50 extracts from the look-ahead buffer 88 the $YZ_F$ coordinate of the feature 28 at the current $X_T$ position of the tool 2 along the feature 28. It computes the position correction YZCORR by subtracting the $YZ_{TC}$ coordinate from the $YZ_F$ coordinate. The new $YZ_{TC}$ coordinate of the tool 2 after this movement is computed by adding the $YZ_{CORR}$ correction to the previous $YZ_{TC}$ coordinate. The CUS 50 informs the CUMS 54, through the communication link 52, that the start position is reached as depicted by block 96 in FIG. 5B, and sends the $YZ_{CORR}$ position correction required by the CUMS 54 to move the motorized slides 6, 8 to bring the tool 2 above the feature 28 as depicted by block 98. Once this operation is achieved, the CUMS 54 activates a start position signal to inform the CUR 56, through the I/O link 58, that the tool 2 reached the start position, as depicted by block 100. When the CUR 56 receives this signal, it stops the movement of the tool 2. It then starts the welding operation as depicted by block 102, starts moving the robot arm 4 along the programmed path and activates a signal to inform the CUMS 54 that the tracking operation can start as depicted by block 104.

The CUMS 54 informs the CUS 50 that the tracking operation started. The CUS 50 computes a new $YZ_v$ feature coordinate in the tool reference system, adds this coordinate to the current $YZ_{TC}$ coordinate of the tool 2 and stores the resulting information $YZ_F$ in the look-ahead buffer 88, associated with the current $X_s$ position of the sensor 26. The CUS 50 extracts from the look-ahead buffer 88 the $YZ_F$ position data corresponding to the current $X_T$ position of the tool 2. It subtracts the current $YZ_{TC}$ position of the tool 2 from the $YZ_F$ position to obtain the $YZ_{CORR}$ position correction required to maintain the tool center point 20 correctly positioned over the feature 28. It sends this correction to the CUMS 54 that moves the motorized slides 6, 8 to apply the correction. This tracking cycle continues until the tool 2 reaches the end of the feature 28, as depicted by blocks 106, 108. The CUS 50 recognizes that the end of the feature 28 is reached when the look-ahead buffer 88 does not contain valid position information at X positions that are beyond the current X position of the tool 2. The CUS 50 informs the CUMS 54 that the end position is reached, as depicted by block 109 in FIG. 5C. The CUMS activates an end of feature signal to inform the CUR 56, through the I/O link 58, that the tool. 2 reached the end of the feature 28, as depicted by block 110. The CUR 50 stops the movement of the robot arm 4 and terminates the welding process, as depicted by block 112.

Figure 7A:
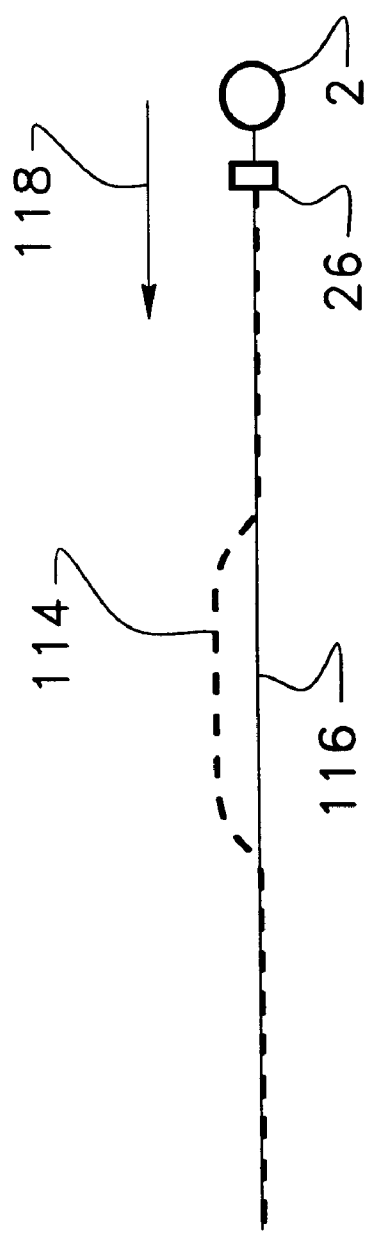
FIGS. 7A and 7B are schematic diagrams illustrating an error that a sensor makes during a feature tracking if the operator did not correctly position it while teaching the path of the robot.
Figure 7B:
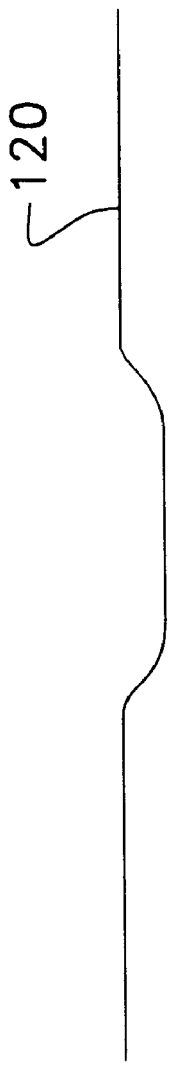
Figure 8A:
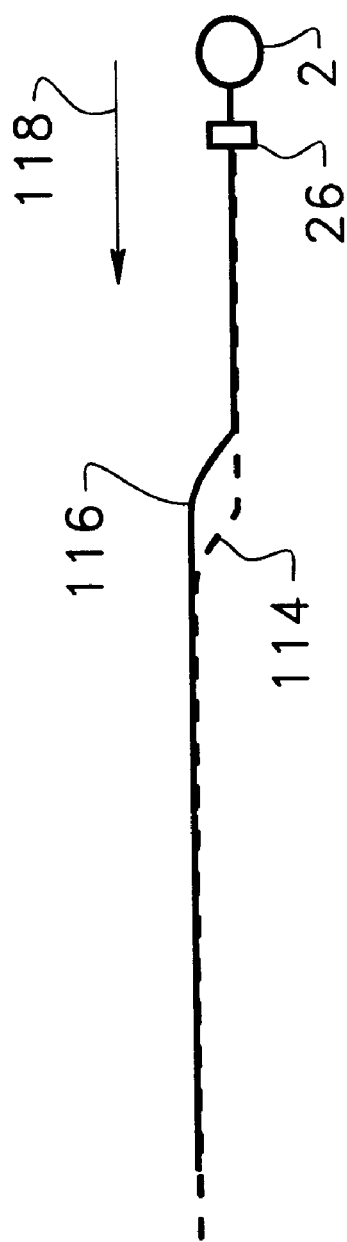
FIGS. 8A and 8B are schematic diagrams illustrating an error that a sensor makes during a feature tracking if the taught path is not straight but follows a deviation of the feature to be tracked.
Figure 8B:
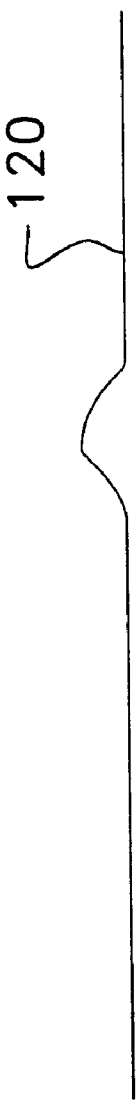

This joint or feature tracking process assumes that the path of the tool 2 was perfectly programmed in the CUR 56. However, because the operator cannot maintain the sensor 26 at a constant position over the joint or feature 28 during the robot teaching phase, the sensor 26 will detect that the feature 28 moves while the robot executes its program, even if the tool center point 20 maintains its position over the feature 28, as illustrated in FIGS. 7A and 7B. FIG. 7A shows an example of the possible path 114 of the sensor 26 and the path 116 of the tool 2 and the position of the feature 28 during a robot teaching phase, with the sensor 26 and tool 2 moving in the direction of the arrow 118. FIG. 7B shows the position 120 of the feature 28 detected by the sensor 26 for the case of FIG. 7A. The same problem happens if the robot is programmed to follow a deviation in the path of the feature 28, as illustrated in FIGS. 8A and 8B. In these cases, the CUS 50 will try to correct the error that the sensor 26 detects and will bring the tool center point 20 out of the joint 28. To eliminate this error, a compensation method is added according to the invention, to record the error during a dry pass over the joint 28 after the robot teaching phase.

Figure 9A:
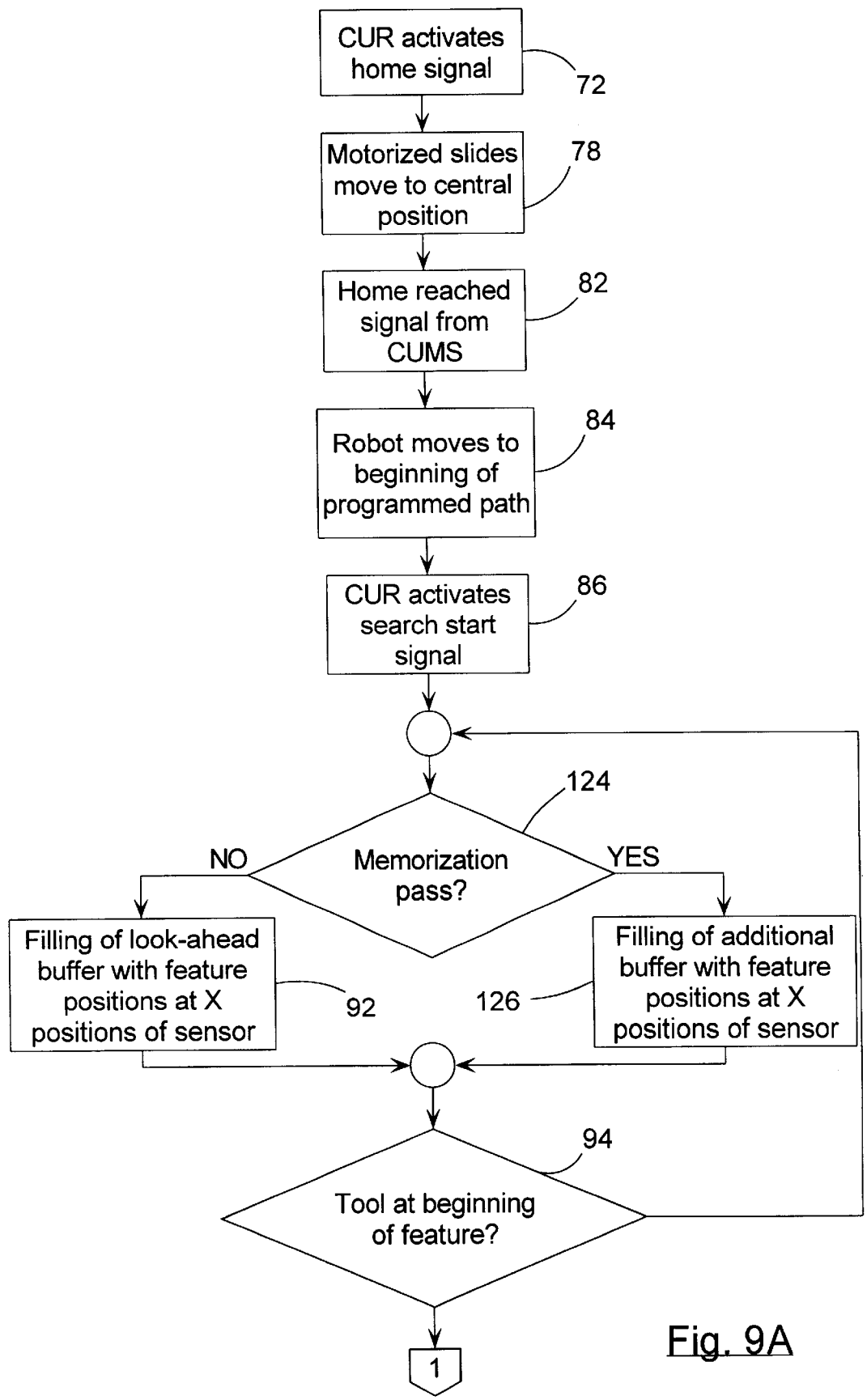
FIGS. 9A, 9B and 9C are complementary flow charts representing the compensation method used to compensate for the errors illustrated in FIGS. 7 and 8, according to the invention.
Figure 9B:
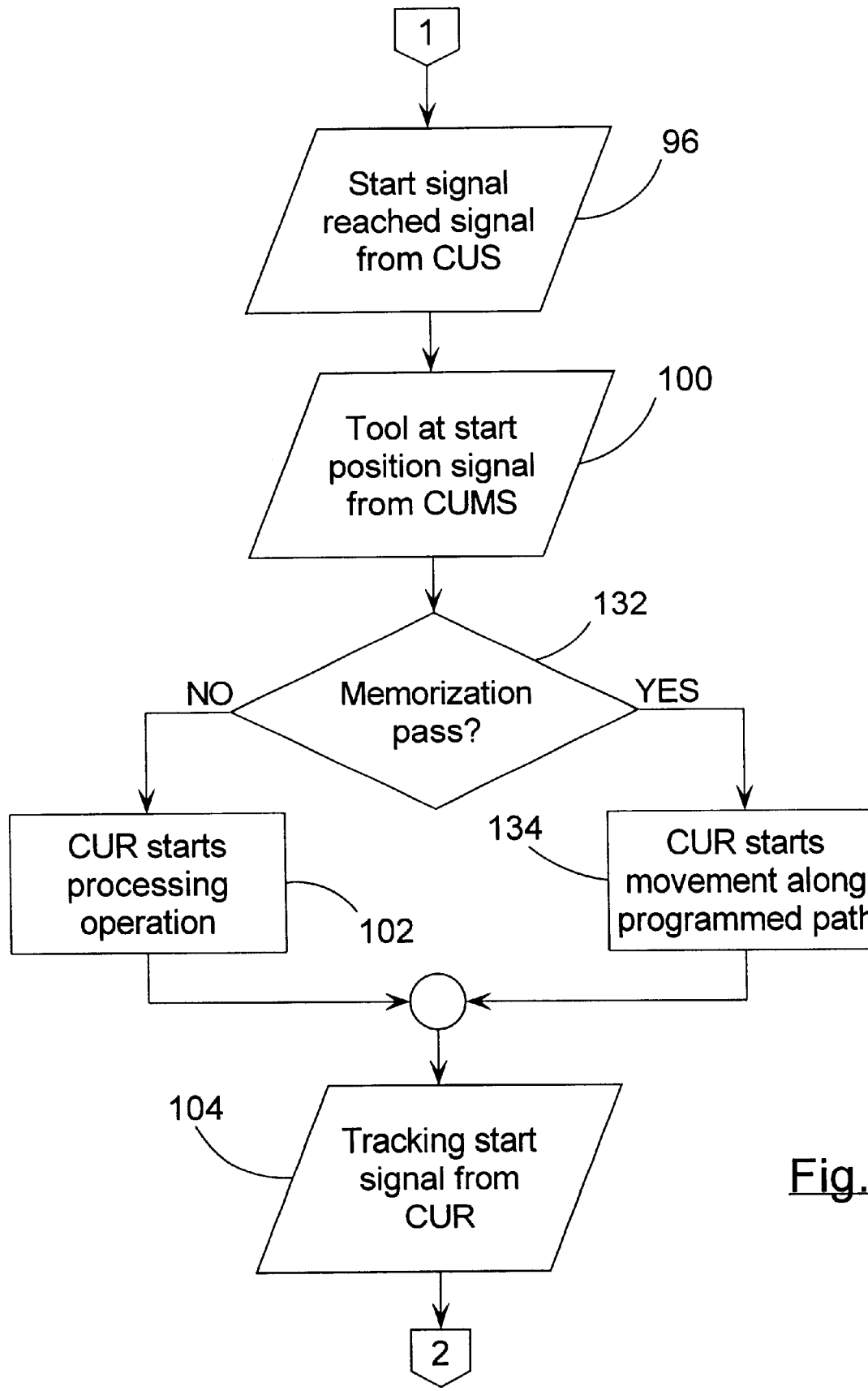
Figure 9C:
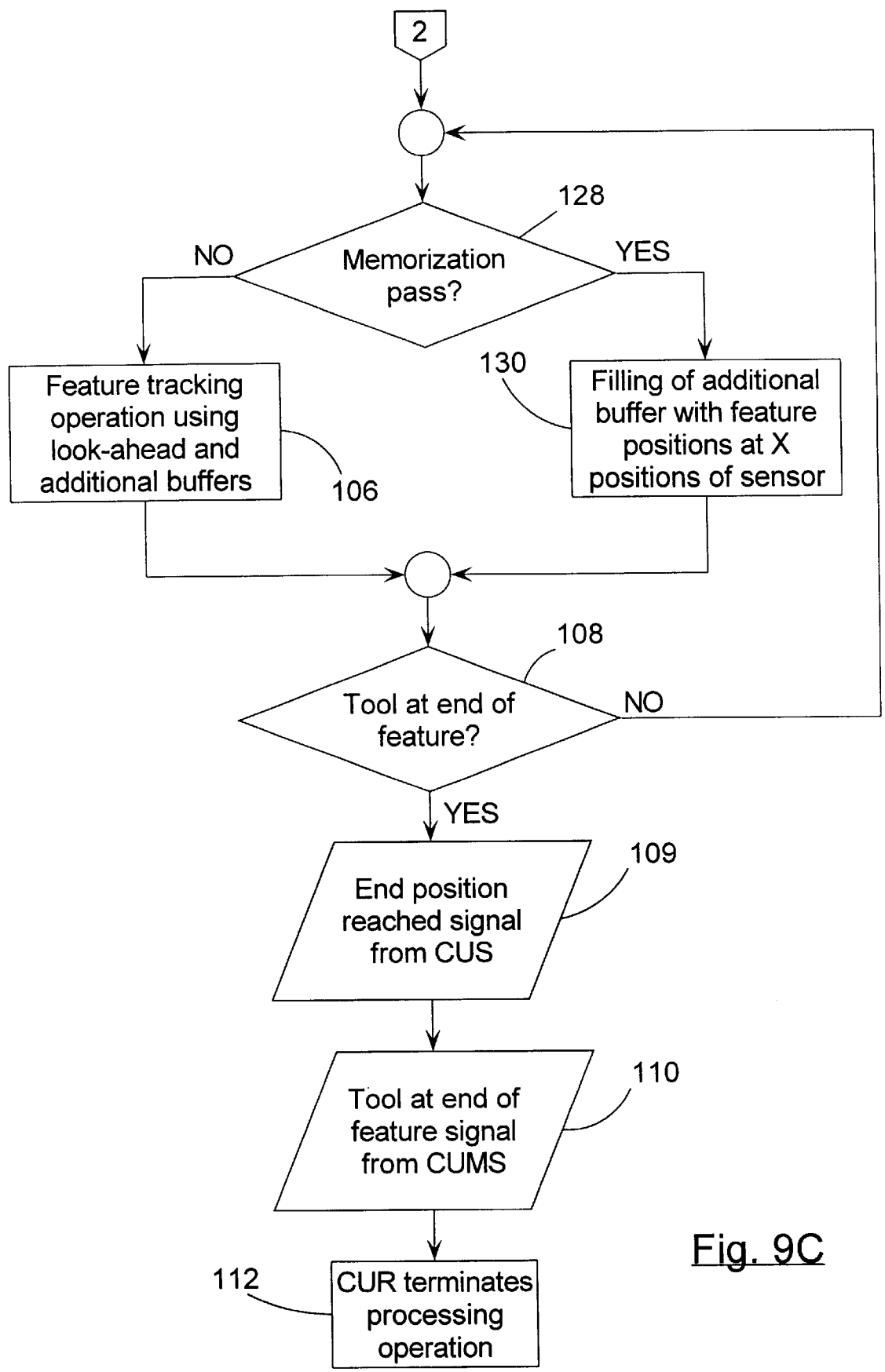

Referring to FIGS. 9A–C, a dry pass is added for the memorization of the position of the joint or feature 28 while the tool 2 moves along the programmed path, according to the invention. During this dry pass, the same general sequence is followed (as hereinabove described and illustrated in FIGS. 5A–C) and the same signals are activated through the I/O link 58 between the CUMS 54 and the CUR 56. However, the CUMS 54 does not move the motorized slides 6, 8 after being informed by the CUS 50 that the start position is reached, and it does not move the motorized slides 6, 8 to track the joint or feature 28.

Figure 10:
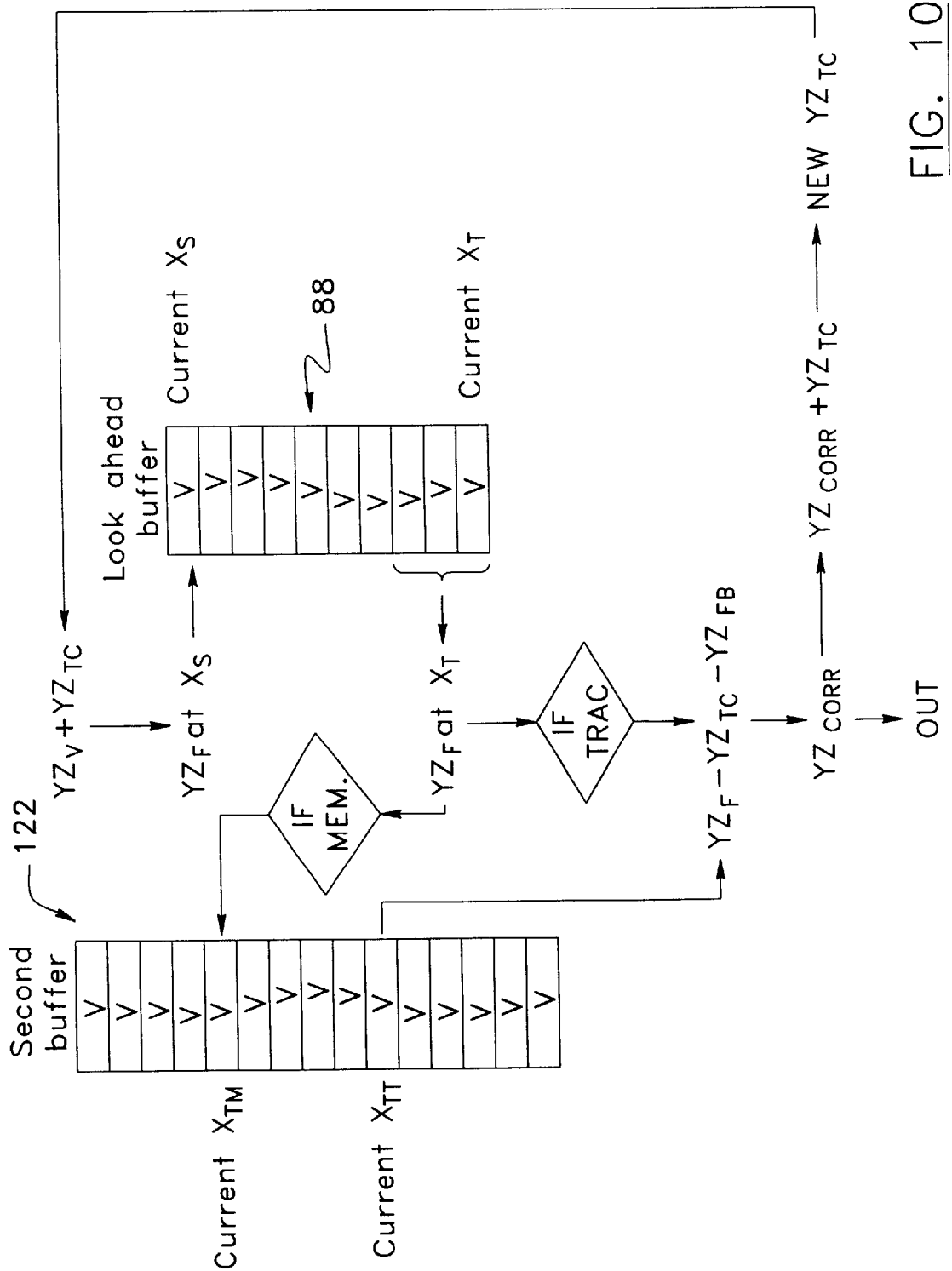
FIG. 10 is a schematic diagram representing a processing made by a slides control unit for the trajectory control with compensation according to the invention, including a look-ahead buffer and an additional buffer.

Referring also to FIG. 10, the CUS 50 memorizes the consecutive positions of the feature 28 associated with the $X_{TM}$ position of the tool 2 in a second or additional buffer 122, where $X_{TM}$ means X position of the tool 2 during the memorization pass, as depicted by blocks 124, 126, 128, 130, with the CUR 56 setting the robot in motion as depicted by blocks 132, 134.

During a normal processing pass, when the CUS 50 computes the corrections that are sent to the CUMS 54, it extracts from the look-ahead buffer 88 the $YZ_F$ position data corresponding to the current $X_T$ position of the tool 2. It also extracts from the second buffer 122 the $YZ_{FB}$ position data corresponding to the current $X_{TT}$ position of the tool 2, where $X_{TT}$ means X position of the tool 2 during the tracking. It first compensates the $YZ_F$ position data extracted from the look-ahead buffer 88 by subtracting the $YZ_{FB}$ position data extracted from the second buffer 122. Knowing the current $YZ_{TC}$ position of the tool 2, it computes the $YZ_{CORR}$ correction required to maintain the tool center point 20 correctly positioned over the joint or feature 28. Because the position data extracted from the look-ahead buffer 88 is compensated for the teaching errors, the CUS 50 will compute corrections that will not track the errors illustrated in the FIGS. 7A–B and 8A–B. This compensation method applies to the feature tracking performed with the motorized slides 6, 8 installed on the robot arm 4 as well as to the feature tracking performed directly by the robot without motorized slides.

When the feature tracking is performed on a robot without additional slides, this compensation method is used to compensate for the calibration errors of the robot arm 4 that cause its absolute position inaccuracy and for the dynamic errors that are caused by its response time and its mechanical elasticity. To compensate for these errors, the CUR 56 is programmed to maintain the tool center point 20 correctly positioned over the feature while moving at the desired production speed. A dry pass is then performed while the compensation process in the CUS 50 records, at consecutive X positions of the sensor 26, the feature position data and the tool center point position information received from the CUR 56. During the processing operation, the compensation process subtracts the recorded data from the position error calculated by the CUS 50, at a given tool center point position received by the robot, to compensate for the positioning errors of the robot and to send the tool center point 20 accurately over the real position of the feature 28.

Figure 11:
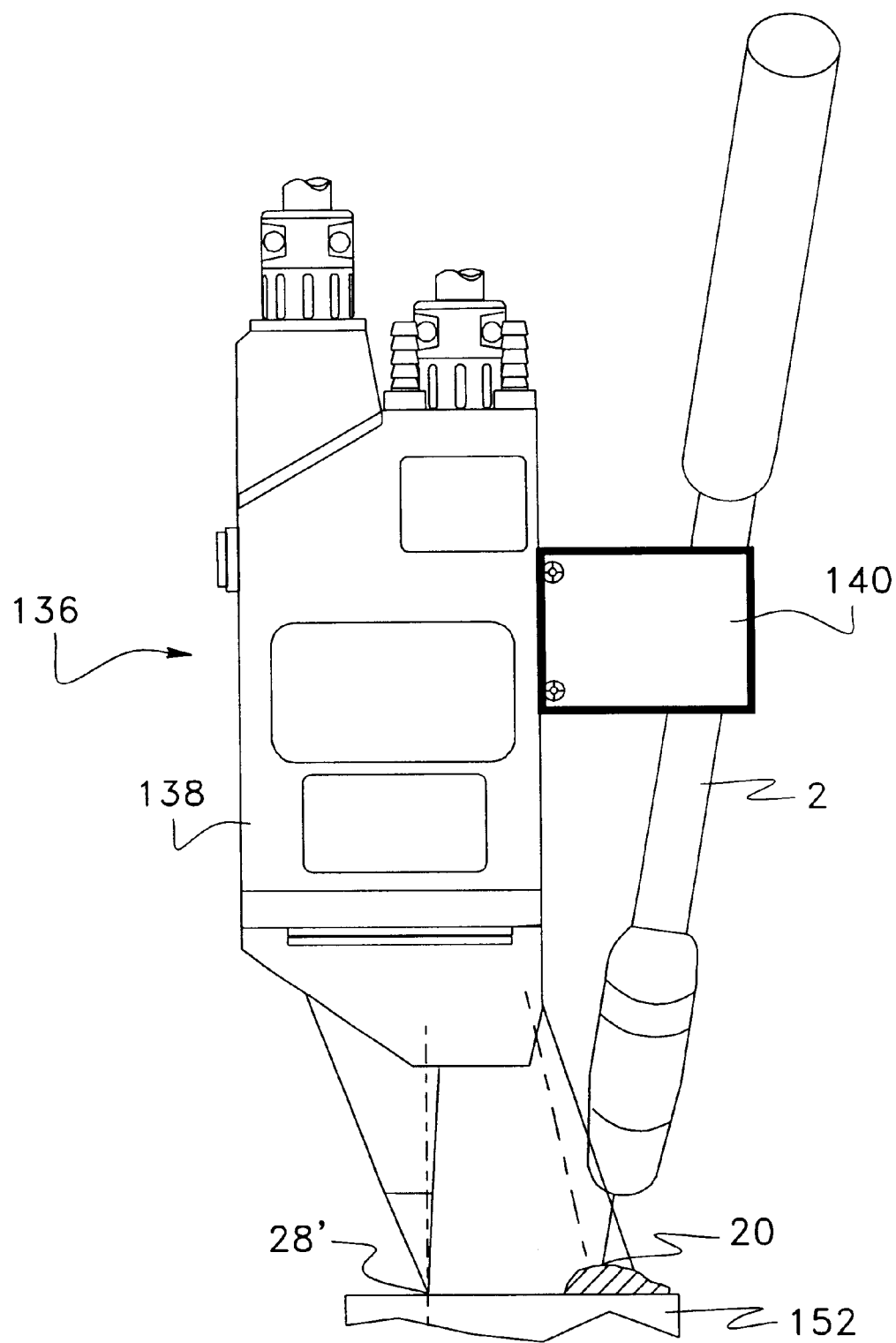
FIG. 11 is a side elevation view of a sensor that integrates two distinct vision zones, according to the invention.

Referring to FIG. 11, the problem of sensor/tool calibration can also be solved by using a special sensor 136 that simultaneously detects the position of the joint 28 in front of the tool 2 and the position of the tip of the tool 20. This special sensor 136 can be a vision sensor that contains two detectors or probes, a first one looking at the joint 28' at a look-ahead distance in front of the tool 2 for providing surface range data along the feature 28 such that the position of the feature 28 at the look-ahead distance is determinable, and a second one looking at the tip 20 of the tool 2 for providing an image of a target region including the tool tip 20 and the feature 28 under the tool tip 20 such that the position of the tip 20 of the tool 2 is determinable. In the illustrated embodiment, the sensor 136 has a body 138 and a bracket 140 for side attachment of the sensor body 138 to the tool 2.

Figure 12:
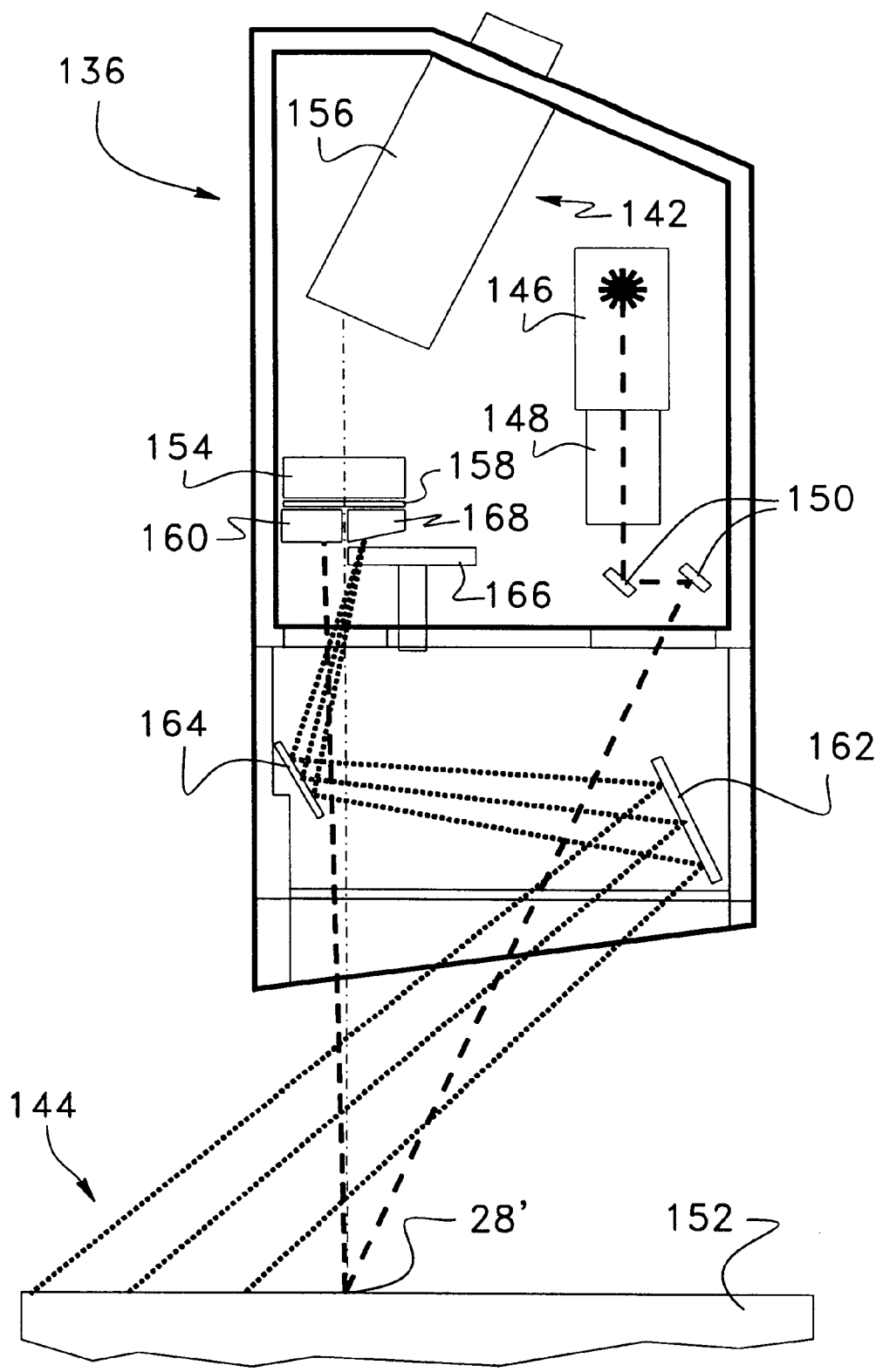
FIG. 12 is a cross section view of a possible optical arrangement for the sensor shown in FIG. 8.

Referring to FIG. 12, the special sensor 136 can also be embodied by a vision sensor that contains only one detector 142, a section of this detector 142 receiving the signal from the feature 28' in front of the tool 2 and another section receiving the signal from the area 144 of the tool center point 20, by using a special arrangement of optical components. It must be understood that other optical arrangements are also possible as long as the simultaneous recording of the joint or feature 28 and of the tool center point 20 is made possible. The area 144 of the tool center point 20 preferably includes the tool tip and the joint under the tool tip. A laser source 146 produces a laser beam which is focused and expanded by a line generator 148 in a crosswise direction relative to the general direction of the feature 28. The expanded laser beam is reflected by a double mirror arrangement 150 and projected on the work piece 152. The light line derived from the line generator 148 is thus directed at a tilt angle relative to a plane in which the feature 28 extends and substantially crosswise to the feature 28 in the measuring field in front of the tool 2. The scattering of the laser beam from each intersection point between the spread laser and the surface of the work piece 152 is collected by an imaging lens 154 and focused on a CCD array sensor 156. The CCD sensor 156 is properly positioned and oriented so that every point within the measuring field is preferably in exact focus. A diaphragm 158 with two apertures separates two optical input channels. The left aperture of the diaphragm 158 faces a filter 160 and limits the collection of radiance from the scattering of the laser beam. The filter 160 lets only the laser light pass and blocks the background lighting, which is considered noisy light for profile measurement.

One part of the sensitive area of the CCD 156 is reserved for profile data acquisition and the other part is used for passive 2D imaging. The range measurement profile data acquisition of the sensor 136 is based on an active optical triangulation principle. The position of the peak of a focused point on one horizontal CCD scan line is related to the range information of the corresponding point on the surface of the work piece 152. The second vision module integrated in the same sensor 136 is a passive 2D imaging module. The passive imaging module has an orientation-adjustable mirror 162 directed toward the target region 144, a fixed mirror 164 facing the mirror 162, a group of optical filters mounted on an adjustable disk 166, a wedge prism 168, the right side aperture of the diaphragm 154 and a second part of the CCD sensor 156. The mirror 162 is oriented to capture the desired observation scene. The observation scene is then reflected by the mirror 164. The light rays are filtered by one of the optical filters mounted on the filter disk 166. One of these filters with a particular spectral transmission is selected to emphasize the observation of a specific process. The selection of one filter is realized by simply turning the filter disk 166. The wedge prism 168 deviates the incident light rays from the mirror 164 into the right side aperture of the diaphragm 158. This wedge prism 168 physically separates two optical channels so that the mirror 164 can be used without blocking the incident beam of the first vision module. The light rays from the right side aperture of the diaphragm 158 is focused by the imaging lens 154 on the sensitive area of the second part of the CCD sensor 156.

Figure 13:
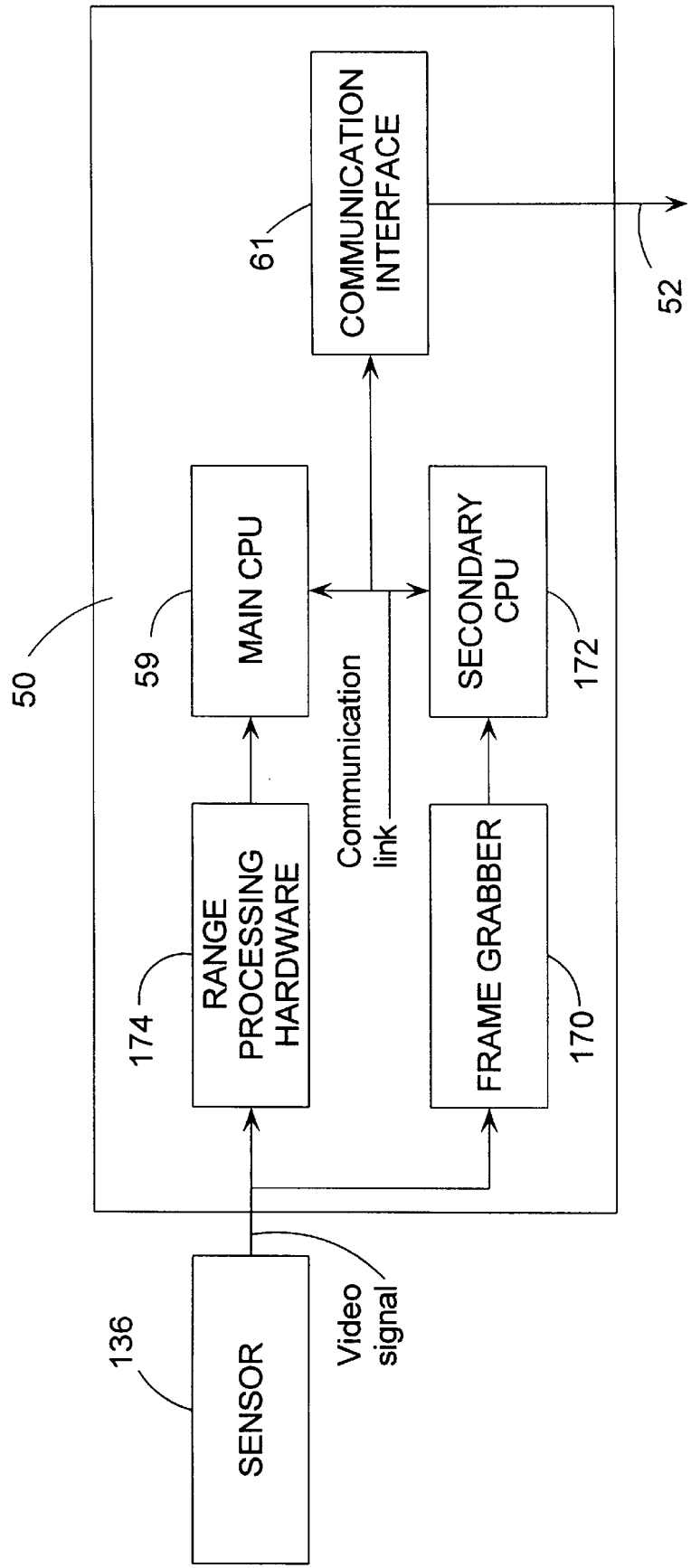
FIG. 13 is a block diagram illustrating the data acquisition and processing system for a sensor with two distinct vision zones, according to the invention.

Referring to FIG. 13, in order to support the added function of the special sensor 136, a frame grabber 170 and its associated CPU 172 are added in the CUS 50. The video signal from the sensor 136 is transmitted to the range processing hardware 174 and to the frame grabber 170. The range processing hardware 174 extracts from the video signal the range information that is used by the main CPU 59 of the CUS 50 to compute the position of the feature 28. The frame grabber 170 stores consecutive image frames from the sensor 136. Its associated CPU 172 processes the stored image frames and extracts the position of the tool tip 20 and sends this information to the main CPU 59.

During a sensor/tool calibration procedure, the position of the tool tip 20 is detected by the secondary CPU 172 and sent to the main CPU 59 to be recorded in the calibration data (e.g. in the memory 57 as shown in FIG. 3). During the subsequent processing operations, the main CPU 59 compares the position of the tool tip 20, received from the secondary CPU 172, to its position recorded in the sensor/tool calibration data. If there is a difference, it is included in the computation of the corrections sent through the communication link 52 by the CUS 50 to the CUMS 54 or the CUR 56 when motorized slides are not used.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A motorized slide assembly for providing additional positioning ability to a tool at an end of a robot arm, comprising:
   a slide arrangement having a base and a sliding element movable along a predetermined course relative to the base;
   a motor mounted onto the slide arrangement;
   a drive means connected to the motor for moving the sliding element along the course upon operation of the motor;
   a means for fastening the base of the slide arrangement to the end of the robot arm; and
   a means for fastening the tool onto the sliding element.

2. The motorized slide assembly according to claim 1, wherein:
   the sliding element comprises a plate and the base comprises spaced apart, opposite lateral surfaces slideably receiving the plate.

3. The motorized slide assembly according to claim 2, wherein:
   the base comprises an elongated frame having spaced apart, opposite end faces extending between the lateral surfaces;
   the motor is mounted on one of the end face; and
   the drive means comprises a worm screw extending between the end faces and coupled to the motor, and a toothed member projecting from the plate and meshed with the worm screw.

4. The motorized slide assembly according to claim 1, wherein:
   the motor is provided with an encoder.

5. The motorized slide assembly according to claim 1, wherein the means for fastening the base of the slide arrangement onto the end of the robot arm comprises a mounting surface provided by the base, adapted to receive the end of the robot arm.

6. The motorized slide assembly according to claim 1, wherein the means for fastening the tool to the sliding element comprises a clamp projecting from the sliding element opposite the base of the sliding arrangement.

7. The motorized slide assembly according to claim 6, wherein the clamp has a mounting surface opposite the sliding element, adapted to receive a sensor.

8. The motorized slide assembly according to claim 1, further comprising:
   an additional slide arrangement having a base and a sliding element movable along a predetermined course relative to the base, the base of the additional slide arrangement being connected to the sliding element of the slide arrangement so that the course of the sliding element of the additional slide arrangement is substantially perpendicular to the course of the sliding element of the slide arrangement, the sliding element of the additional slide arrangement being provided with the means for fastening the tool to the sliding element;
   a motor mounted onto the additional slide arrangement; and
   a drive means connected to the motor mounted onto the additional slide arrangement, for moving the sliding element of the additional slide arrangement along the course upon operation of the motor.

9. The motorized slide assembly according to claim 8, further comprising a block assembling the slide arrangements.

10. A motorized slide system for providing additional positioning ability to a tool at an end of a robot arm, comprising:
    a motorized slide assembly including:
       a slide arrangement having a base and at least one sliding element movable along a predetermined course relative to the base;
       at least one motor mounted onto the slide arrangement;
       at least one drive means connected to said at least one motor for moving said at least one sliding element along the course upon operation of said at least one motor;
       a means for fastening the base of the slide arrangement to the end of the robot arm;
       a means for fastening the tool onto said at least one sliding element; and
       at least one encoder operatively coupled to said at least one motor to provide motor positional information; and
    a control unit for the motorized slide assembly, including:
       a communication interface for receiving sensor related data;
       a I/O interface for receiving and transmitting synchronization signals;
       a CPU for controlling positions of said at least one sliding element;
       a memory;
       a servo-amplifier circuit for powering said at least one motor;
       a slides control for controlling said servo-amplifier circuit in response to the CPU and the motor positional information provided by said at least one encoder; and
       a bus circuit interconnecting the communication interface, the I/O interface, the CPU, the memory and the slides control together.

11. A compensation method for compensating errors made by a control unit of a robot sensor when evaluating a relation between a position of a robot guided tool behind the sensor and a position of a feature to be followed by the guided tool, comprising the steps of:
    recording position data generated by the sensor during a dry pass of the guided tool over the feature, the position data representing consecutive positions of the feature detected by the sensor; and subtracting the recorded position data from joint position errors computed by the control unit during a feature tracking operation where the guided tool is operated to process the feature.

12. The compensation method according to claim 11, wherein:
the control unit comprises a look-ahead buffer that stores a number of position data of the feature detected by the sensor ahead of the guided tool from a prior position of the sensor to a position of the sensor when the guided tool reaches the prior position of the sensor;
the recorded position data are stored in an additional buffer of the control unit, the recorded position data being sampled at a same sampling rate than the position data stored in the look-ahead buffer; and
the step of subtracting comprises, during the feature tracking operation:
extracting the position data of the feature stored in the look-ahead buffer corresponding to a current position of the guided tool;
extracting the position data stored in the additional buffer corresponding to a current position of the guided tool; and
subtracting the position data derived from the additional buffer and a current position data of the guided tool from the position data derived from the look-ahead buffer to produce a position correction data that compensates the position data extracted from the look-ahead buffer from teaching errors.

13. The compensation method according to claim 12, further comprising the steps of:
adding the position correction data to the current position data of the guided tool to provide a new current position data for the guided tool;
adding the new current position data for the guided tool to the position data of the feature at a current position of the sensor, to provide a look-ahead position data for the feature; and
storing the look-ahead position data in the look-ahead buffer in relation with the current position of the sensor.

14. A control unit for a robot sensor tracking a feature to be processed with a robot tool positioned behind the robot sensor, comprising:
a sensor interface having a sensor control output and a video input;
a memory connected to the sensor interface;
a CPU connected to the sensor interface and the memory; and
a communication interface connected to the CPU, the memory and the sensor interface, and having a communication port; wherein:
the memory includes:
a look-ahead buffer that stores a number of successive feature position data computed by the CPU from signals received at the video input, as a function of tracked successive positions reached by the robot sensor during displacement over the feature; and
an additional buffer connected to the look-ahead buffer, that stores a number of the successive feature position data as a function of tracked successive positions reached by the robot tool;
and the CPU has an operating mode causing a computation of a corrected position value required to maintain the robot tool correctly positioned over the feature by subtracting a current position of the robot tool and one of the position data stored in the additional buffer related to the current position of the robot tool from one of the position data stored in the look-ahead buffer related to the current position of the robot tool, and a transmission of the corrected position value through the communication port of the communication interface.

15. The control unit according to claim 14, wherein the CPU computes a next current position of the robot tool by adding the corrected position value to the current position of the robot tool.

16. The control unit according to claim 15, wherein the current position of the robot tool corresponds to a tool center point received through the communication port of the communication interface.

17. A robot sensor assembly for simultaneously detecting a position of a feature at a given look-ahead distance in front of a tool and a position of a tip of the tool, comprising:
a sensor body;
a bracket for side attachment of the sensor body to the tool;
a first probe means attached to the sensor body and directed toward the feature in front of the tool, for providing surface range data along the feature whereby the position of the feature at the look-ahead distance in front of the tool is determinable; and
a second probe means attached to the sensor body and directed toward a target region including the tip of the tool and the feature under the tip of the tool, for providing an image of the target region whereby the position of the tip of the tool is determinable.

18. The robot sensor assembly according to claim 17, wherein:
the first probe means comprises an optical profiler module providing surface height samples forming the surface range data; and
the second probe means comprises a vision module providing the image of the target region.

19. The robot sensor assembly according to claim 18, wherein:
the optical profiler module has a first portion comprising:
a laser source;
a line generator coupled to the laser source;
mirrors optically coupled to the line generator and directing a light line derived therefrom at a tilt angle relative to a plane in which the feature extends and substantially crosswise to the feature in a measuring field in front of the tool; and
a background lighting filter arranged to filter a scattering of the light beam derived from the light line crossing the feature;
the vision module has a first portion comprising:
an orientation-adjustable mirror directed toward the target region;
a fixed mirror facing the orientation-adjustable mirror;
an adjustable disk provided with a group of optical filters selectively positionable behind the fixed mirror; and
a wedge prism behind the adjustable disk and next to the background lighting filter of the first part of the optical profiler module;
and the optical profiler and vision modules have a combined second portion comprising:
a diaphragm behind the background lighting filter and the wedge prism, with apertures facing respectively the background lighting filter and the wedge prism;

an imaging lens behind the diaphragm; and a CCD sensor positioned behind the imaging lens and having a first sensitive area oriented so that every point within the measuring field, viewed through the imaging lens, is substantially in focus, and a second sensitive area oriented to receive light rays passing through the wedge prism and the imaging lens.

20. A sensor control unit for a robot sensor assembly according to claim 18, comprising:

a range processing circuit having an input for receiving a video signal produced by the robot sensor, and an output for producing surface range data extracted from the video signal;

a frame grabber having an input for receiving the video signal produced by the robot sensor, and an output for providing image frames stored in the frame grabber;

a main CPU having an input connected to the output of the range processing circuit, and a communication port, a secondary CPU having an input connected to the output of the frame grabber, and a communication port;

a communication link interconnecting the communication ports of the main and the secondary CPUs; and a communication interface connected to the communication link;

and wherein:

the secondary CPU has an operating mode causing a processing of the image frames stored in the frame grabber, a determination of the position of the tip of the tool from the image frames, and a transmission of the position of the tip of the tool to the main CPU via the communication link; and the main CPU has a sensor/tool calibration mode causing a storage of the position of the tip of the tool received from the secondary CPU as calibration data, and a subsequent processing mode causing a comparison of the position of the tip of the tool received from the secondary CPU with a corresponding position in the calibration data, a computation of tool positioning correction values, and a transmission of the correction values through the communication interface.

\* \* \* \* \*